United States Patent [19]
Huang et al.

[11] Patent Number: 6,064,955
[45] Date of Patent: *May 16, 2000

[54] LOW COMPLEXITY MBE SYNTHESIZER FOR VERY LOW BIT RATE VOICE MESSAGING

[75] Inventors: Jian-Cheng Huang, Lake Worth; Kenneth D. Finlon, Wellington; Floyd D. Simpson, Lantana, all of Fla.

[73] Assignee: Motorola, Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/058,924

[22] Filed: Apr. 13, 1998

[51] Int. Cl.[7] ....................................................... G10L 11/06
[52] U.S. Cl. .......................... 704/208; 704/214; 704/268
[58] Field of Search ..................................... 704/205, 206, 704/207, 208, 214, 200, 203, 268, 258, 267, 266, 211

[56] References Cited

U.S. PATENT DOCUMENTS

5,664,051  9/1997  Hardwick et al. ...................... 704/206

*Primary Examiner*—Richemond Dorvil
*Attorney, Agent, or Firm*—Pablo Meles

[57] ABSTRACT

A MBE synthesizer (2200) for generating speech from information received by a receiver (114) includes a voiced signal generator (2280) for generating voiced signal components in the time domain using an IDFT in a pitch wave generator (2210) and and a pitch wave resampler (2232) and an unvoiced signal generator (2290) for generating unvoiced signal components in the time domain. The MBE synthesizer also includes a voicing processor (2218) responsive to band voicing flags within the excitation information for controlling selection of a voiced spectral component or an unvoiced spectral component from a harmonic amplitude spectrum.

10 Claims, 8 Drawing Sheets

LOW COMPLEXITY MBE SYNTHESIZER FOR VERY LOW BIT RATE VOICE MESSAGING

FIELD OF THE INVENTION

This invention relates generally to voice processors used in communication receivers, and more specifically to a digital signal processor which utilizes very low bit rate data transmission rates in a compressed voice digital communication system to obtain high quality voice messages.

BACKGROUND OF THE INVENTION

Communications systems, such as paging systems, have had to compromise the length of messages, number of users and convenience to the user in order to operate the systems profitably. The number of users and the length of the messages were limited to avoid over crowding of the channel and to avoid long transmission time delays. The user's convenience is directly affected by the channel capacity, the number of users on the channel, system features and type of messaging. In a paging system, tone only pagers that simply alerted the user to call a predetermined telephone number offered the highest channel capacity but were some what inconvenient to the users. Conventional analog voice pagers allowed the user to receive a more detailed message, but drastically limited the number of users on a given channel. Analog voice pagers, being real time devices, also had the disadvantage of not providing the user with a way of storing and repeating the message received. The introduction of digital pagers with numeric and alphanumeric displays and memories overcame many of the problems associated with the older pagers. These digital pagers improved the message handling capacity of the paging channel, and provided the user with a way of storing messages for later review.

Although the digital pagers with numeric and alpha numeric displays offered many advantages, some user's still preferred pagers with voice announcements. In an attempt to provide this service over a limited capacity digital channel, various digital voice compression techniques and synthesis techniques have been tried, each with their own level of success and limitation. Voice compression methods, based on vocoder techniques, currently offer a highly promising technique for voice compression. Of the low data rate vocoders, the multi band excitation (MBE) vocoder is among the most natural sounding vocoder.

The vocoder analyzes short segments of speech, called speech frames, and characterizes the speech in terms of several parameters that are digitized and encoded for transmission. The speech characteristics that are typically analyzed include voicing characteristics, pitch, frame energy, and spectral characteristics. Vocoder synthesizers use these parameters to reconstruct the original speech by mimicking the human voice mechanism. In other words, vocoder synthesizers mimick the original speech by creating a waveform having the same pitch, frame energy parameters, voicing characteristics, and spectrum shape as the original speech wave form to provide natural sounding synthetic speech. Vocoder synthesizers model the human voice as an excitation source, controlled by the pitch and frame energy parameters followed by a spectrum shaping controlled by the spectral parameters.

The voicing characteristic describes the repetitiveness of the speech waveform. Speech consists of periods where the speech waveform has a repetitive nature and periods where no repetitive characteristics can be detected. The periods where the waveform has a periodic repetitive characteristic are said to be voiced. Periods where the waveform seems to have a totally random characteristic are said to be unvoiced. The voiced/unvoiced characteristics are used by the vocoder speech synthesizer to determine the type of excitation signal which will be used to reproduce that segment of speech.

Pitch defines the fundamental frequency of the repetitive portion of the voiced wave form. Pitch is typically defined in terms of a pitch period or the time period of the repetitive segments of the voiced portion of the speech wave forms. The speech waveform is a highly complex waveform and very rich in harmonics. The complexity of the speech waveform makes it very difficult to extract pitch information. Changes in pitch frequency must also be smoothly tracked for an MBE vocoder synthesizer to smoothly reconstruct the original speech. The human auditory process is very sensitive to changes in pitch and the perceived quality of the reconstructed speech is strongly effected by the accuracy of the pitch derived.

Frame energy is a measure of the normalized average RMS power of the speech frame. This parameter defines the loudness of the speech during the speech frame.

The spectral characteristics define the relative amplitude of the harmonics and the fundamental pitch frequency during the voiced portions of speech and the relative spectral shape of the noise-like unvoiced speech segments. The data transmitted defines the spectral characteristics of the reconstructed speech signal.

The human voice, during periods that are classified as voiced, has portions of the spectrum that are unvoiced. MBE vocoders produce natural sounding speech because speech waveforms, during a voiced period, are mixtures of voiced and unvoiced frequency bands. The speech spectrum is divided into a number of frequency bands and a determination is made for each band as to the voiced/unvoiced nature of each band. In conventional MBE vocoders, the band voiced/unvoiced information can be transmitted explicitly or can be determined at the synthesizer using tables which associate voicing patterns with spectral vectors, or other means. Transmission of explicit band voicing data increases the quantity of data that must be transmitted. The use of tables by the synthesizer occupies a substantial quantity of memory and can be less accurate than explicit data. Other methods may require excessive computational complexity and are inappropriate for low-power, inexpensive devices. Accordingly, what is needed for optimal utilization of a channel in a communication system, such as a paging channel in a paging system or a data channel in a non-real time one way or two way data communication's system is an MBE synthesizer that accurately reproduces voice from compressed data, using methods which are well suited to implementation on low cost, low power devices, while maintaining acceptable speech quality.

DESCRIPTION OF A PREFERRED EMBODIMENT

Figure 1:
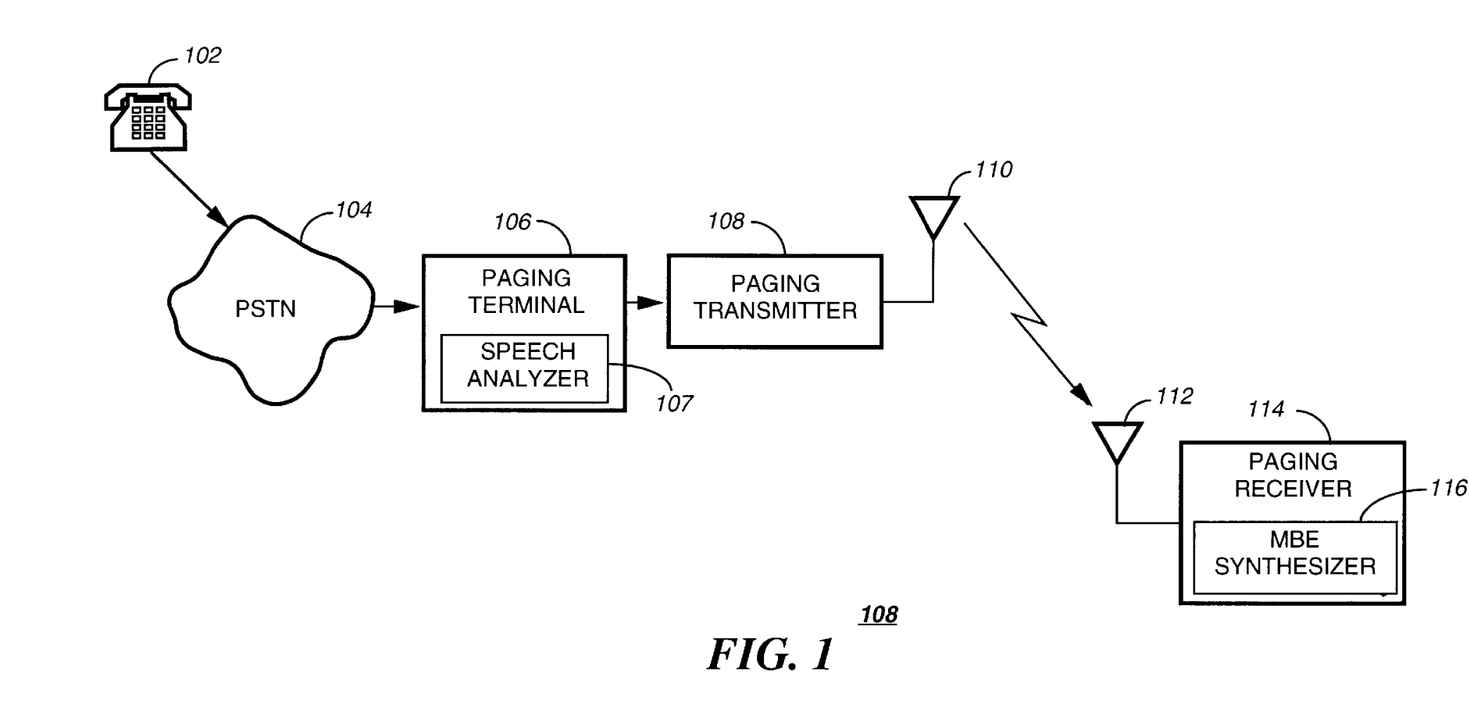
FIG. 1 is a block diagram of a very low bit rate voice messaging system using an MBE synthesizer in accordance with the present invention.

FIG. 1 is a block diagram of a very low bit rate voice messaging system, such as provided in a paging or data transmission system, which utilizes speech compression to provide a very low bit rate speech transmission using the Multi Band Exciter (MBE) synthesizer in accordance with the present invention. As will be described in detail below, a paging terminal 106 uses a unique speech analyzer 107 to generate excitation parameters and spectral parameters representing speech data, and the communication receiver, such as a paging receiver 114, uses a unique MBE synthesizer 116 to reproduce the original speech.

By way of example, a paging system will be utilized to describe the present invention, although it will be appreciated that any digital voice communication system will benefit from the present invention as well. A paging system is designed to provide service to a variety of users, each requiring different services. Some of the users may require numeric messaging services, other users alpha-numeric messaging services, and still other users may require voice messaging services. In a paging system, the caller originates a page by communicating with a paging terminal 106 via a telephone 102 through a public switched telephone network (PSTN) 104. The paging terminal 106 prompts the caller for the recipient's identification, and a message to be sent. Upon receiving the required information, the paging terminal 106 returns a prompt indicating that the message has been received by the paging terminal 106. The paging terminal 106 encodes the message and places the encoded message into a transmission queue. In the case of a voice message, the paging terminal 106 compresses and encodes the message using a speech analyzer 107. At an appropriate time, the message is transmitted using a transmitter 108 and transmitting antenna 110. It will be appreciated that a simulcast transmission system, utilizing a multiplicity of transmitters covering different geographic areas can be utilized as well.

The signal transmitted from the transmitting antenna 110 is intercepted by a receiving antenna 112 and processed by a receiver 114, shown in FIG. 1 as a paging receiver. Voice messages received are decoded and reconstructed using an MBE synthesizer 116. The person being paged is alerted and the message is displayed or annunciated depending on the type of messaging being received. The digital voice encoding and decoding process used by the speech analyzer 107 and the MBE synthesizer 116, described herein, is readily adapted to the non-real time nature of voice paging and any non-real time digital voice communication system. These non-real time digital voice communication systems provide the time required to perform a highly computational compression process on the voice message. Delays of up to two minutes can be reasonably tolerated in paging systems, whereas delays of two seconds are unacceptable in real time communication systems. The asymmetric nature of the digital voice compression process described herein minimizes the processing required to be performed at the receiver 114, making the process ideal for paging applications and other similar non-real time digital voice communications. The highly computational portion of the digital voice compression process is performed in the fixed portion of the system, i.e. at the paging terminal 106. Such operation, together with the use of an MBE synthesizer 116 that utilizes an efficient synthesis algorithm, greatly reduces the computation required to be performed in the portable portion of the communication system. The speech analyzer 107 analyzes the voice message and generates a set of speech model parameters for each segment of speech (each speech segment preferably being 25 ms long). The parameter set consists of a flag to indicate whether any voiced spectral bands are present and a set of spectral magnitudes. When the flag indicates the presence of voiced spectral bands, the parameter set for the frame will additionally contain flags for each of the 10 spectral bands to indicate whether those bands represent voiced or unvoiced speech and a respective pitch value. The pitch value defines the fundamental frequency of the of the repetitive potion of speech. Pitch is measured as the period of the fundamental frequency.

Harmonic magnitudes are calculated by the speech analyzer 107 by taking the Discrete Fourier Transform (DFT) of a speech frame after pre-processing. The harmonic amplitudes are quantized to achieve compression by means of searching multiple code books to find the closest matching spectral shapes and gains. The indices of three vectors representing the low frequency spectral shape, high frequency spectral shape, and a pair of gain factors are derived from this process. No information representing the phases of the spectral components is generated or transmitted to the MBE synthesizer. Instead, a unique phase model, described below, is used by the MBE synthesizer to artificially regenerate phase information at the receiver 114. This unique technique eliminates the need to transmit additional data to convey the phase information.

The frame voiced/unvoiced parameter describes the repetitive nature of the speech. Segments of speech that have a highly repetitive waveform are described as being voiced. Even when the speech segment is classified as voiced, some spectral bands may exhibit unvoiced characteristics, while other bands exhibit voiced characteristics. The success of the multiband excitation vocoders is largely attributed to the flexibility to mix unvoiced and voiced components as necessary to produce natural speech signals. The MBE synthesizer 116 accomplishes this by dividing the spectrum into a number of sub-bands and utilizing information describing the voiced/unvoiced nature of the speech in each sub-band. The sub-band voiced/unvoiced parameters in conventional synthesizers must be generated by the speech analyzer 107 and transmitted to the MBE synthesizer 116 or a set of tables that relate the sub-band voiced/unvoiced information and the spectral information must be stored in the receiver 114. In the present invention, a combination of these two methods is used. The first band is assumed to be voiced if the frame is classified as voiced. Bands 2, 3 and 4 are each designated explicitly by one bit in each voiced frame. The status of bands 5 through 10 are inferred by the MBE synthesizer 116 without additional explicit data being transmitted. This is accomplished by means of codebooks which use the index for the high frequency spectral components. This implicit method achieves a reduction in transmitted data at the expense of possible errors in the inferred band voicing decisions. The RMS parameter is an index into a codebook for a pair of gain factors which is generated by the speech analyzer 107 and is used by the MBE synthesizer 116 to establish the volume of the reproduced speech. A pair of gain factors is used to provide separate gain factors to each of the two spectral vectors representing the low frequency and high frequency components respectively.

Figure 2:
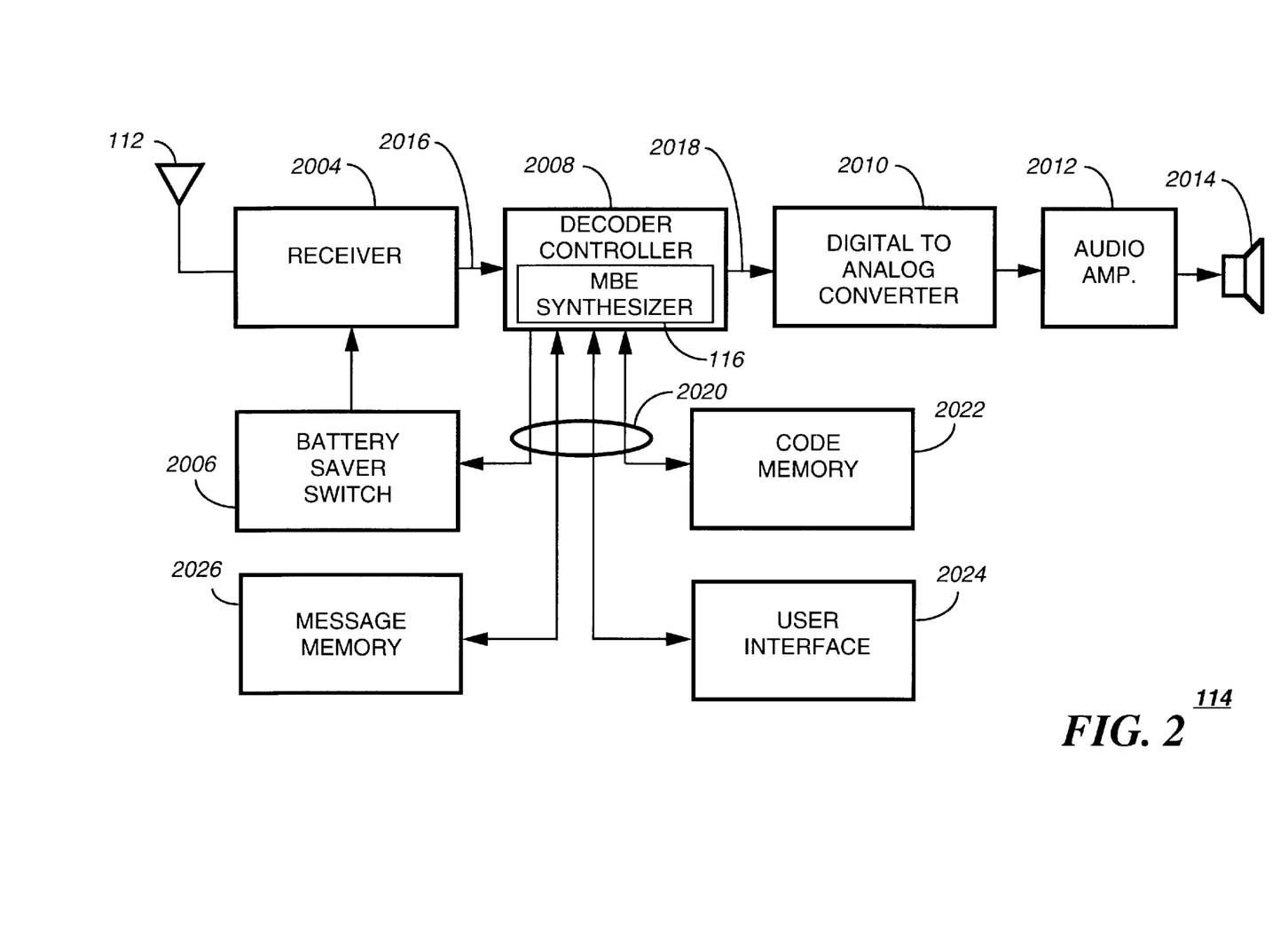
FIG. 2 is an electrical block diagram of the receiver shown in FIG. 1.

FIG. 2 is an electrical block diagram of the receiver 114 of FIG. 1, such as a paging receiver or a data communication receiver. The signal transmitted from the transmitting antenna 110 is intercepted by the receiving antenna 112 which is coupled to a receiver 2004. The receiver 2004 processes the signal received by the receiving antenna 112 and produces a receiver output signal 2016 which is a replica of the encoded data transmitted. The encoded data is encoded in a predetermined signaling protocol. One such encoding method is the InFLEXion™ voice protocol, developed by Motorola Inc. of Schaumburg, Ill., although it will be appreciated that there are other suitable encoding methods that can be utilized as well, for example, the Post Office Code Standards Advisory Group (POCSAG) code. A digital signal processor 2008 typically performing the function of a decoder, controller and MBE synthesizer 116 processes the receiver output signal 2016 and produces a decompressed digital speech data 2018 as will be described below. A digital to analog converter 2010 converts the decompressed digital speech data 2018 to an analog signal that is amplified by the audio amplifier 2012 and annunciated by a speaker 2014.

The digital signal processor 2008 also provides the basic control of the various functions of the receiver 114. The digital signal processor 2008 is coupled to a battery saver switch 2006, a code memory 2022, a user interface 2024, and a message memory 2026, via the control bus 2020. The code memory 2022 stores unique identification information or address information, necessary for the controller to implement the selective call feature. The user interface 2024 provides the user with an audio, visual or mechanical signal indicating the reception of a message and can also include a display and push buttons for the user to input commands to control the receiver. The message memory 2026 provides a place to store messages for future review, or to allow the user to repeat the message. The battery saver switch 2006 provide a means of selectively disabling the supply of power to the receiver during a period when the system is communicating with other pagers or not transmitting, thereby reducing power consumption and extending battery life in a manner well known to one of ordinary skill in the art.

Figure 3:
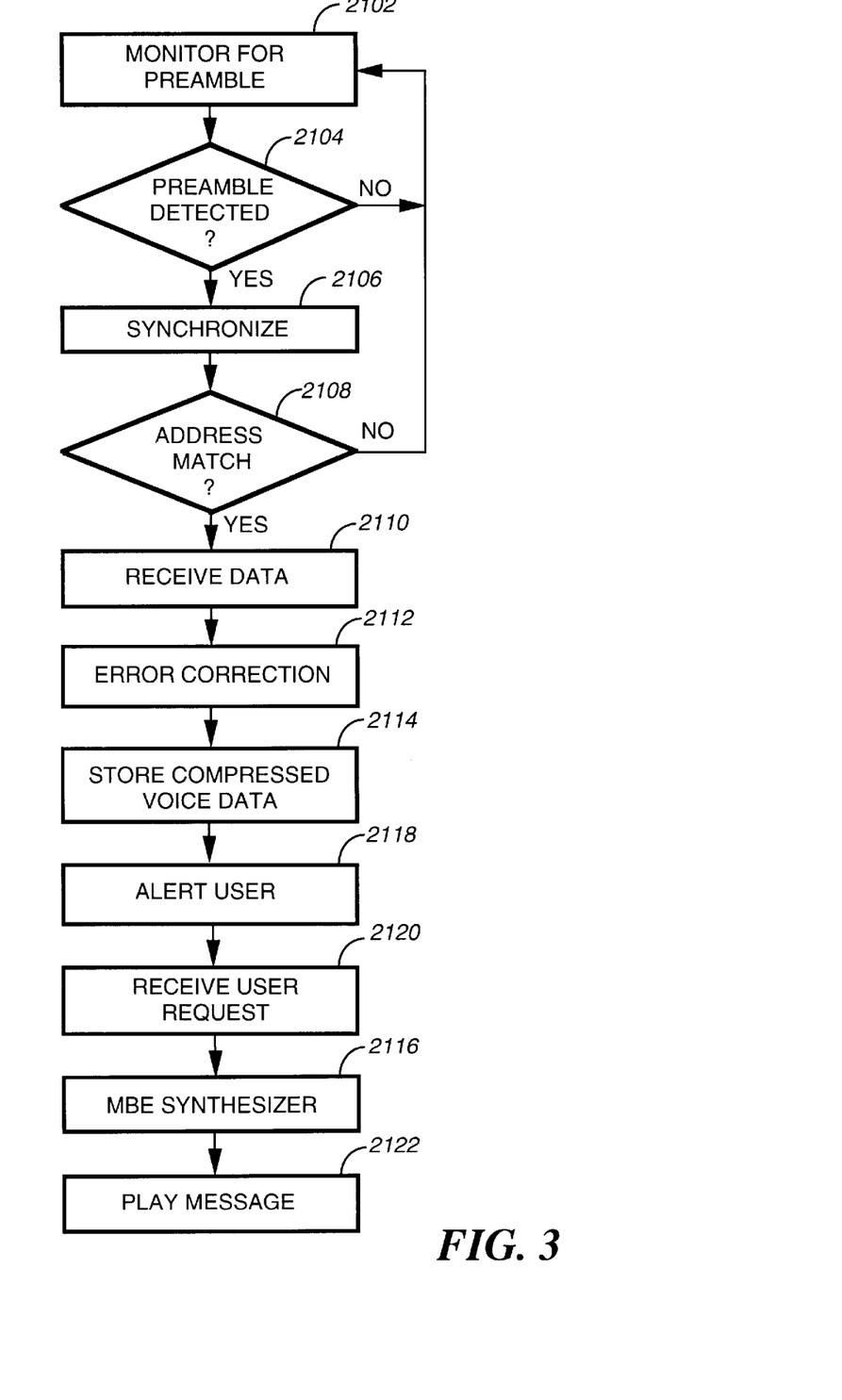
FIG. 3 is a flow chart which illustrates the operation of the receiver of FIG. 2.

FIG. 3 is a flow chart which illustrates the operation of the receiver 114 of FIG. 2. In step 2102, the digital signal processor 2008 sends a command to the battery saver switch 2006 to supply power to the receiver 2004. The digital signal processor 2008 monitors the receiver output signal 2016 for a bit pattern indicating that the paging terminal is transmitting a signal modulated with a preamble.

At step 2104, a decision is made as to the presence of the preamble. When no preamble is detected, then the digital signal processor 2008 sends a command to the battery saver switch 2006 to inhibit the supply of power to the receiver 2004 for a predetermined length of time. After the predetermined length of time, at step 2102, monitoring for preamble is again repeated as is well known in the art. In step 2104, when a preamble is detected, the digital signal processor 2008 will synchronize at step 2106 with the receiver output signal.

When synchronization is achieved, the digital signal processor 2008 may issue a command to the battery saver switch 2006 to disable the supply of power to the receiver 2004 until the frame assigned to the receiver 114 is expected. At the assigned frame, the digital signal processor 2008 sends a command to the battery saver switch 2006 to supply power to the receiver 2004. In step 2108, the digital signal processor 2008 monitors the receiver output signal 2016 for an address that matches the address assigned to the receiver 114. When no match is found the digital signal processor 2008 sends a command to the battery saver switch 2006 to inhibit the supply of power to the receiver until the next transmission of a synchronization code word or the next assigned frame, after which step 2102 is repeated. When an address match is found then in step 2108, power is maintained to the receiver 2004 and the data is received at step 2110.

In step 2112, error correction is performed on the data received in step 2110 to improve the quality of the data. Error correction techniques are well known to one of ordinary skill in the art. The corrected data is stored in step 2114. In step 2118, the digital signal processor 2008 sends a command to the user interface 2024 to alert the user. In step 2120, the user enters a command to play out the message. In step 2116, the MBE synthesizer processes the stored data and passes the results (2018) to the digital to analog converter 2010 for play out. The digital to analog converter 2010 converts the digital speech data 2018 to an analog signal that is amplified by the audio amplifier 2012 and anunciated by speaker 2014 in real time resulting in the playing of the message at step 2122.

Figure 4:
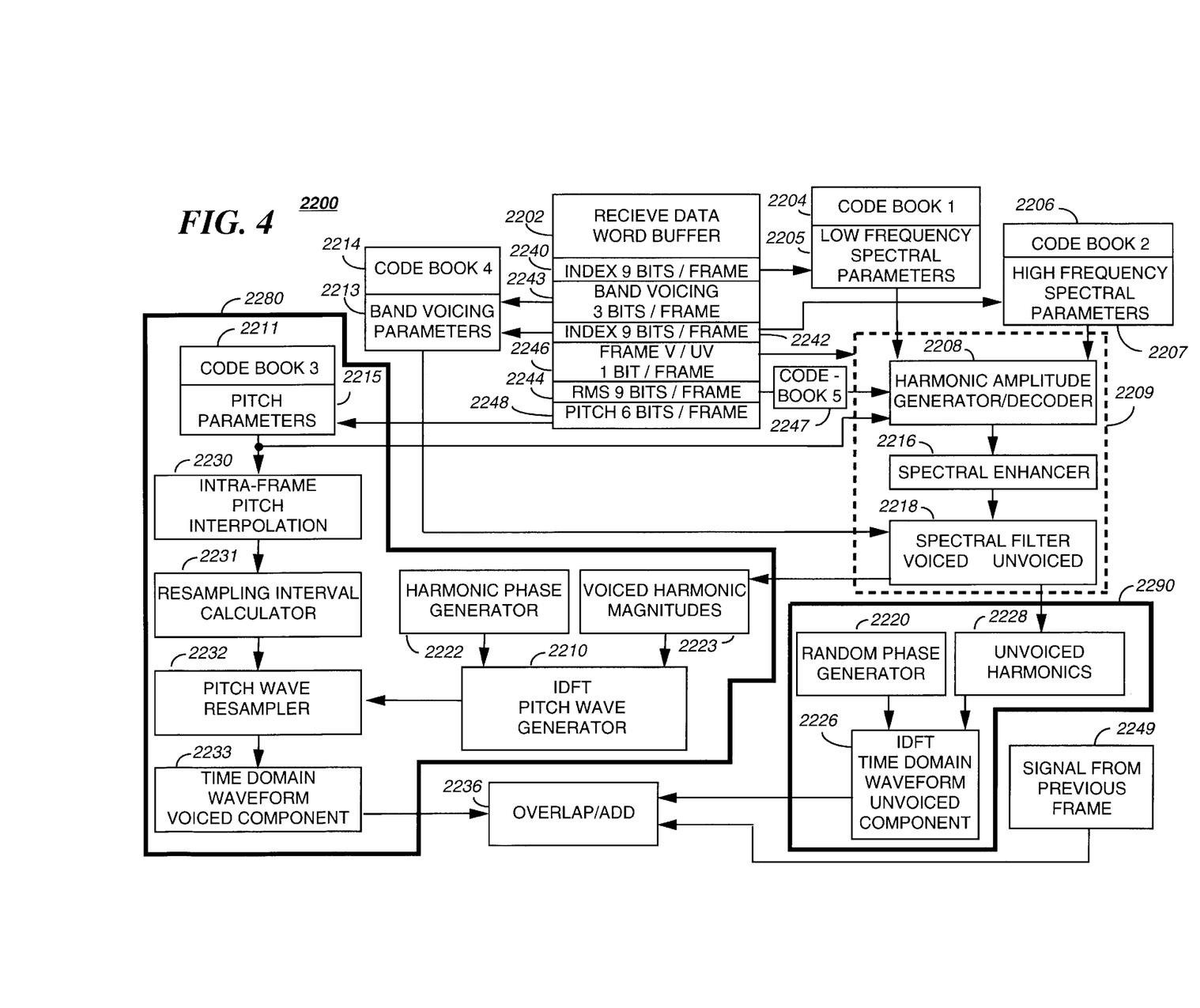
FIG. 4 is a block diagram showing the MBE synthesizer in accordance with the present invention (for voiced frames).
Figure 5:
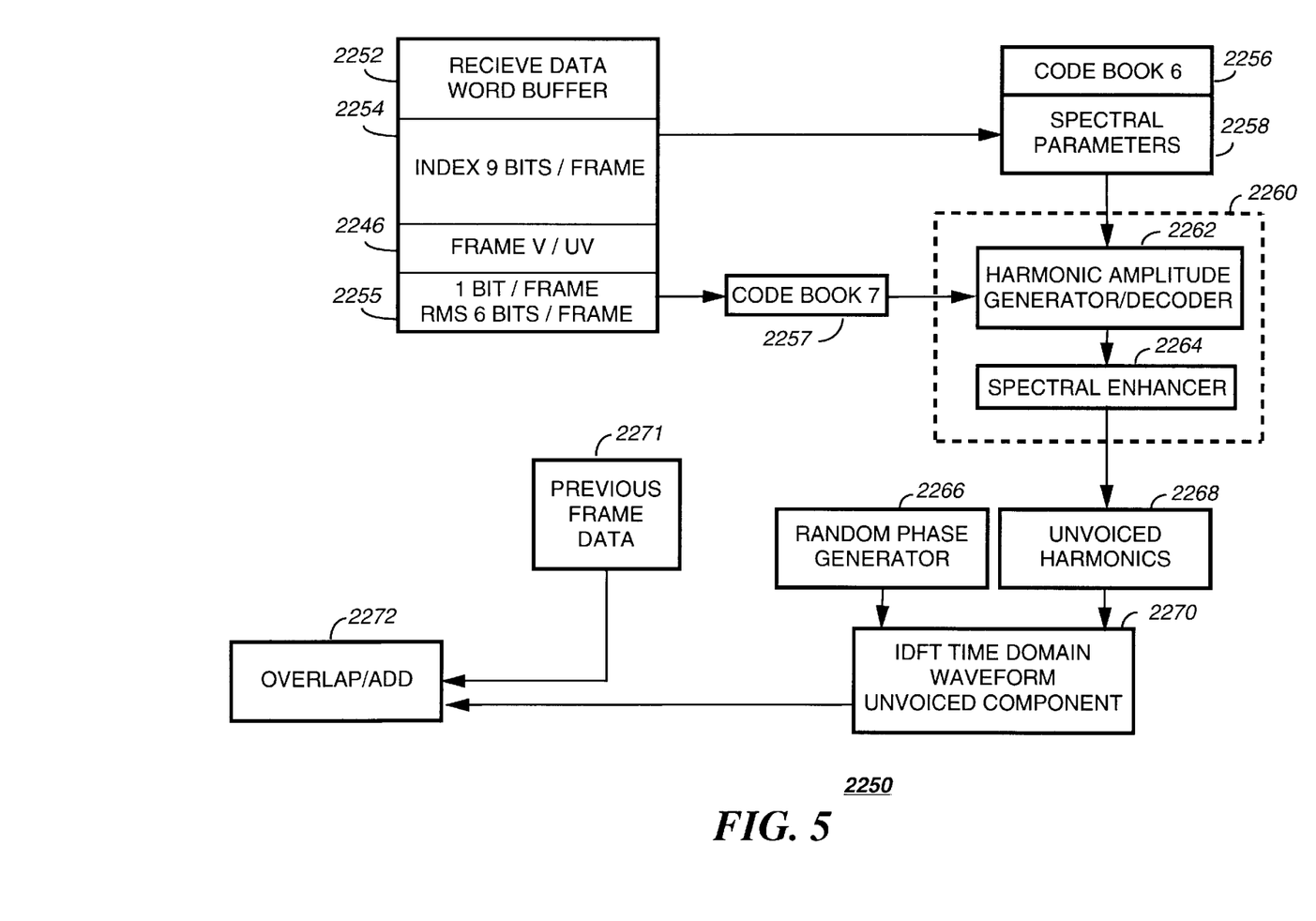
FIG. 5 is a block diagram showing an additional portion of the MBE synthesizer in accordance with the present invention (for unvoiced frames).

FIG. 4 is a block diagram of the MBE synthesizer 116 shown in FIG. 2. The MBE synthesizer 116 generates segments of speech from compressed speech data which are received by receiver 114 as one of two data elements, depending on whether the frame is classified as voiced or as unvoiced, as previously discussed. When voiced, the data is preferably a 37 bit data word stored in an input buffer 2202. The thirty-seven bit data word stored in the input buffer 2202 and decoded in step 2116 comprises four indices, a first nine bit spectral vector index 2240, a second nine bit spectral vector index 2242, a nine bit RMS vector index 2244, and a six bit pitch scalar index 2248. Additionally, the data word contains a one bit of frame voicing data 2246, and three bits of band voicing data 2243. When the speech frame is unvoiced, the data is preferably a sixteen bit codeword stored in input buffer 2252 as shown in FIG. 5. The sixteen bit word stored in the input buffer 2252 and decoded in step 2116 comprises two indices, a nine bit spectral vector index 2254 and a six bit RMS scalar index 2255. Additionally, the input buffer 2252 stores a single bit of frame voicing data 2246.

The first nine bit index 2240 is coupled to a code book 2204 to provide a first index that corresponds to low frequency spectral parameters 2205. The second nine bit index 2242 is coupled to code book two 2206 to provide a second index that corresponds to high frequency spectral parameters 2207. The code book 2204 stores a first table of predetermined spectral vectors 2205 and the code book two 2206 stores a second table of predetermined spectral vectors 2207. Each predetermined spectral vectors 2205 and 2207 comprise a plurality of spectral parameters.

The second nine bit index 2242 is coupled to a codebook 2214 to provide six band voicing status flags 2213. Together with the three explicit band voicing status bits 2243, and the one bit of frame voicing data 2246, the status of each of ten voicing bands is specified. The voiced/unvoiced information is fed to the spectral filter 2218.

The output of the harmonic amplitude estimator 2208 is coupled to the spectral enhancer 2216 which provides a spectral enhancement function. The output of the spectral enhancer 2216 is coupled to the spectral filter 2218 which in turn processes the voiced and unvoiced portions of a "voiced" frame.

The six bits of pitch information 2248 are provided to a code book 2211 (code book 3) to provide an index corresponding to pitch parameters 2215. The pitch parameters 2215 are used by the harmonic amplitude generator 2208 as previously explained as well as by an intra-frame pitch interpolator 2230 which provides for smooth transitions in pitch frequency from frame to frame. The interpolated pitch values are then used by a resampling interval calculator 2231, a pitch wave resampler 2232 which in turn provides a time domain waveform for the voiced component as will be explained in further detail below.

Signal generators 2280 (voiced) and 2290 (unvoiced) in the form of a harmonic phase generator 2222 and a random phase generator 2220 assist to generate transformed voiced signal components and transformed unvoiced signal components respectively preferably utilizing Inverse Discrete Fourier transform (IDFT) functions. In addition, the signal generator 2280 preferably includes an IDFT pitch wave generator 2210 that utilizes the output of the voiced portion of the spectral filter 2218 via a Voiced Harmonic Magnitude module 2223 to provide appropriate indexed amplitude and phase values to the pitch wave generator 2210. The signal generator 2290 preferably provides an IDFT time domain waveform for the unvoiced component 2226 by utilizing inputs from both the random phase generator 2220 and unvoiced harmonics values 2228 derived from the unvoiced portion of the spectral filter 2218. The output of the IDFT inverse transform generator 2226 is coupled to an overlap adder 2236 which produces digitized samples similar to the original speech message. More accurately, the overlap adder 2236 first adds the time domain waveform voiced component (2233) for the current frame with the time domain waveform of the unvoiced component (2226) for the current frame and then overlap adds a portion of the current resultant waveform signal with a portion of the resultant waveform signal from the previous frame 2249. The technique used in the present invention preferably uses one of many overlap-adding techniques well known in the art. In addition to the voiced signal generator and the unvoiced signal generator, the MBE synthesizer further preferably comprises a voicing processor (2218) that is responsive to band voicing flags within the spectral information. The voicing processor controls the selection of a voiced spectral component or an unvoiced spectral component from a harmonic amplitude spectrum.

The harmonic amplitude estimator 2208 preferably receives a set of spectral parameters that reside in a predetermined spectral vector 2205 stored in a table of predetermined spectral vectors in code book 2204 which is indexed by the first nine bit index 2240, a set of residue parameters that reside in a predetermined residue vector stored in a table of residue vectors in code book two 2206 which is indexed by the second nine bit index 2242, and the pitch value 2215 indexed by 2248 to generate a variable length harmonic amplitude function as described below. The table of predetermined spectral vectors 2205 stored in code book 2204 are duplicates of the tables of predetermined spectral vectors, which comprise code books used by the paging terminal 106 during the speech compression process.

As described above, a set of two nine bit code books is utilized, however it will be appreciated that more than one code book and code books of different sizes, for example ten bit code books or twelve bit code books, can be used as well.

It will also be appreciated that a single code book having a larger number of predetermined spectral vectors and a single stage quantization process can also be used, or that a split vector quantizer which is well known to one ordinarily skilled in the art can be used to code the spectral vectors as well. It will also be appreciated that two or more sets of code books optimized for representing different dialects or languages can also be provided.

The sets of spectral values indexed by the first nine bit index 2240 and by the second index 2242 together with the RMS values indexed by the nine bit index 2244 are used to control the spectral component magnitudes passed to the signal generator 2280 and more particularly voice harmonic magnitude module 2223.

The length of the variable length harmonic amplitude function is determined by the pitch value 2215 indexed by the six bits pitch index 2248. The variable length amplitude function has one value for each of the harmonic frequencies. In the preferred embodiment of the present invention, the number of harmonics in the amplitude function is calculated using the following formula:

$$N = INT\left(\frac{.9375 \times Pitch}{2}\right)$$

where;
INT is a function that returns the largest integer less than or equal to a number and Pitch is the length of the longest periodic component (in samples, when sampled at 8000 samples per second) and N equals the number of harmonics.

The variable length harmonic amplitude function created from spectral vectors 2205 and 2207 after they have been scaled by the two RMS values from code book 2247 (codebook 5). The variable length harmonic harmonic amplitude function is determined by interpolating spectral vectors 2205 and 2207 at N harmonic frequencies, integer multiples of the fundamental frequency.

$$f_i = i f_0 \quad i = 1 \ldots N$$

where $f_0$ is the fundamental frequency.

The parameters of the variable length harmonic amplitude function, generated by the harmonic amplitude estimator 2208, are analyzed and adjusted by a spectral enhancer 2216. The spectral enhancement function of the spectral enhancer 2216 compensates for the under estimation of the harmonic amplitude by harmonic amplitude estimator 2208 and for the spectral distortion generated by noise. The spectral enhancer 2216 generates an enhanced variable length harmonic amplitude function.

The spectral filter 2218 transforms the enhanced variable length harmonic amplitude function into two spectral functions. These two spectra contain the voiced components and unvoiced components. The voiced/unvoiced determination for each spectral component is decided by the value unvoiced/unvoiced status of the appropriate band voicing parameter 2213. The appropriate band voicing parameter for each spectral component is selected based on the frequency of the spectral components and the frequency bands of the voicing parameters. The voiced spectral components are processed by the voiced spectrum processor 2280 and the unvoiced components are processed by unvoiced spectrum processor 2290.

The voiced spectrum processor 2280 receives a variable length input array representing the voiced spectral magnitudes. These magnitudes are combined with phase values and further processed to generate a set of input values for a Pitch Waveform Generator 2210. The method of processing the voiced spectral components is preferably constrained so that the IDPT by the generator 2210 generates a single cycle of the desired waveform with a length always equal to 128 samples. This processing preferably includes the following steps: 1) Create an IDFT input array with 128 complex input values, 2) Generate 64 phase values as described later, 3) Set the real component of input values 2 through N+1 as the product of the cosine of the phase value times the spectral magnitude, 4) Set the imaginary component of input values 2 through N+1 as the product of the sine of the phase times the spectral magnitude, 5) Assign zero to input values N+2 through 65, if any, 6) Set input value #1 and #65 equal to zero and 7) Apply symmetry to set input values 66 through 128. The real part of the ith input is set equal to the real part of input number 130−i; the imaginary part of the ith input is set equal to the negative of the imaginary part of input number 130−i. In the above process, N is the number of harmonic components, as previously discussed.

The phase values referred to above, are determined by the following process. Thirty one phase values corresponding to values to be combined with the first thirty voiced harmonics are precomputed and stored as fixed values. Any remaining harmonics beyond thirty one, if any, are given a phase value determined by a pseudo-random process.

The operation of the harmonic amplitude estimator 2209 is described in a related Patent Application, application Ser. No. 08/591,995, filed Jan. 26, 1996, by Huang, et al., entitled "Very Low Bit Rate Time Domain Speech Analyzer For Voice Messaging" which is assigned to the Assignee of the present invention.

The pitch wave generator 2210 produces the basic synchronous pitch signal, indirectly responsive to the six bits of pitch data 2248 that was received in the thirty-seven bit data word and stored in a input buffer 2202. The synchronous pitch signal is used by the MBE synthesizer 116 to reproduce the original speech. The pitch is defined as the number of samples between the repetitive portions of the pitch signal. This waveform is a prototype of the periodic or voiced component of the speech signal. Transformation of this signal by means of resampling yields the needed voice component. The preferred manner of resampling the waveform is described below.

Figure 9:
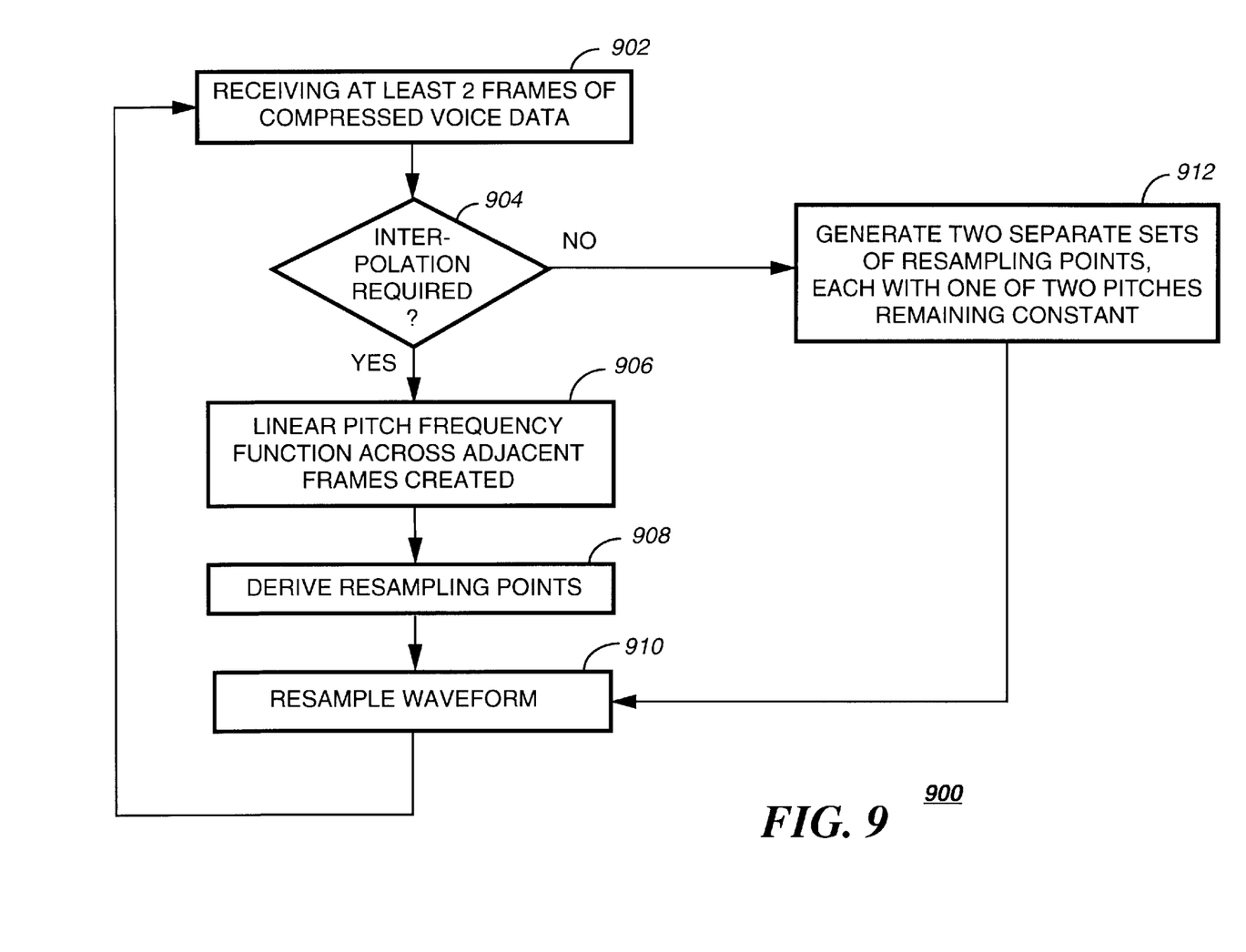
FIG. 9 is a flow chart illustrating the method of resampling in accordance with the present invention.

In another aspect of the present invention and with reference to FIG. 9, a method 900 of interpolating a pitch function in a speech synthesizer from discrete pitch values included in a compressed voice message comprises the steps of receiving (902) at least two frames of the compressed voice message data including a respective pitch value for each of the frames and determining whether interpolation is appropriate from frame to frame at decision block 904. Interpolation is not required if a discontinuous jump in the pitch frequency and the respective pitch value variation from frame to frame is beyond a predetermined threshold. Conversely, if the respective pitch value variation from frame to frame is within a predetermined threshold, then interpolation is appropriate. If it is determined that interpolation is appropriate, then a linear pitch frequency function across adjacent frames is created at step 906. Then, a single set of resampling points is derived at step 908 based on the linear pitch frequency function. This set of resampling points is used to resample the pitch waveforms corresponding to the two frames involved at step 910. If a linear pitch interpolation is not appropriate at decision block 904, then the two separate sets of resampling points are generated at step 912, each with one of the two pitches remaining constant. These two sets of resampling points are used to resample the respective pitch waveform from the appropriate frame as previously explained at step 910.

Returning to FIG. 4, the unvoiced harmonics processor 2228 generates an IDFT input spectrum using the harmonic magnitude classified as unvoiced by the spectrum filter 2218. The spectrum created contains 256 complex input values representing discrete frequencies from 0 to 8000 Hz. Each of the first 129 complex values is assigned a magnitude equal to the magnitude of the unvoiced harmonic magnitude which has the closest frequency value. Each of these input magnitudes is converted into real and imaginary complex values by use of phases obtained from a pseudo-random process. The real part is set equal to the magnitude times the cosine of the phase and the imaginary part is set equal to the magnitude times the sine of the phase. IDFT input values 130 through 256 are defined by symmetry with inputs values 128 through 2. Specifically:

real $(i)$=real $(258-i)$ and imag $(i)$=−imag $(258-i)$ for i=130 . . . 256 where input values #1 and #129 are initialized to zero (0).

The IDFT inverse transform generator 2210 performs an Inverse Discrete Fourier Transform (IDFT) to produce a virtual-time domain function. It is a virtual-time domain function because the time scale must be transformed by resampling to create a waveform with the desired pitch interval of the original speech as described below. This occurs in the pitch resampler 2232 which is controlled indirectly by the pitch values 2215 after processing. This generates a true time domain waveform representing the voiced speech component which is to be combined with an unvoiced signal from the unvoiced signal processor 2290 and further combined with signals from adjacent frames in the overlap adder 2236. The time domain function is overlapped by the past and future frame in the overlap adder 2236 to generate a pulse amplitude coded representation of the original speech. The sampled speech segments are preferably extended such that all segments overlap the previous and future segments by fifty percent. An overlap adder function 2236 tends to smooth the transition between speech segments. The operation of the overlap adder function 2236 is well known to one of ordinary skill in the art.

The preferred method of resampling the pitch wave to yield the desired time domain values is to evaluate the formula:

$$\tau = a + bt + ct^2$$

where $$b = Np/Pl$$

$$c = \frac{Np(1/p2 - 1/p1)}{2Ns}$$

p1=the pitch at the beginning of the interval being processed.

p2=the pitch at the end of the interval being processed.

Np=the length of the pitch wave being resampled (128 points)

Ns=the number of samples to be evaluated in interval being processed (200 points).

t=each time value from 1 to 200 for which a sample is needed.

a=a constant corresponding to the last value of τ from the previous frame, or zero in the first frame.

Note that the value of τ is taken as the result of this function, modulo 128. With τ specified for each value of t, the true time signal s(t) is found by evaluating the original pitch wave at τ(τ), using linear interpolation when τ is not an integer.

It should be understood that other methods well known to one of ordinary skill in the art may be used to calculate the needed resampling points.

Referring to FIG. 5, a block diagram illustrates the portion of the MBE synthesizer that efficiently processes unvoiced information for a particular frame of speech. This portion of the MBE synthesizer 116 generates segments of speech from unvoiced compressed speech data which are received by receiver 114 as preferably a sixteen bit data word and stored in a input buffer 2252. The sixteen bit data words stored in the input buffer 2202 and decoded in step 2114 comprise one or more indexes including a nine bit index 2254, a one bit voiced/unvoiced parameter 2246, and a 6 bit RMS parameter 2255. The 9 bit index 2254 is used by a sixth code book 2256 containing spectral parameters 2258 that correspond to the 9 bit index values. The spectral parameters provide an input to a harmonic amplitude estimator 2260 which includes a harmonic amplitude generator/decoder 2262 coupled to a spectral enhancer 2264. In addition to the spectral parameters, the Harmonic amplitude generator/decoder 2262 uses the 6 bits of RMS parameters to establish the volume of the reproduced speech (for the unvoiced components).

The output from the harmonic amplitude estimator 2260 is used as an input signal to an unvoiced harmonics module 2268. Thus, in combination with inputs from a random phase generator 2266 and the unvoiced harmonics module 2268, an Inverse Discrete Fourier Transform function 2270 provides a time domain waveform for the unvoiced component of a compressed speech segment. As previously explained, the current frame information or data is overlap added (2272) with the previous frame data 2271.

Figure 6:
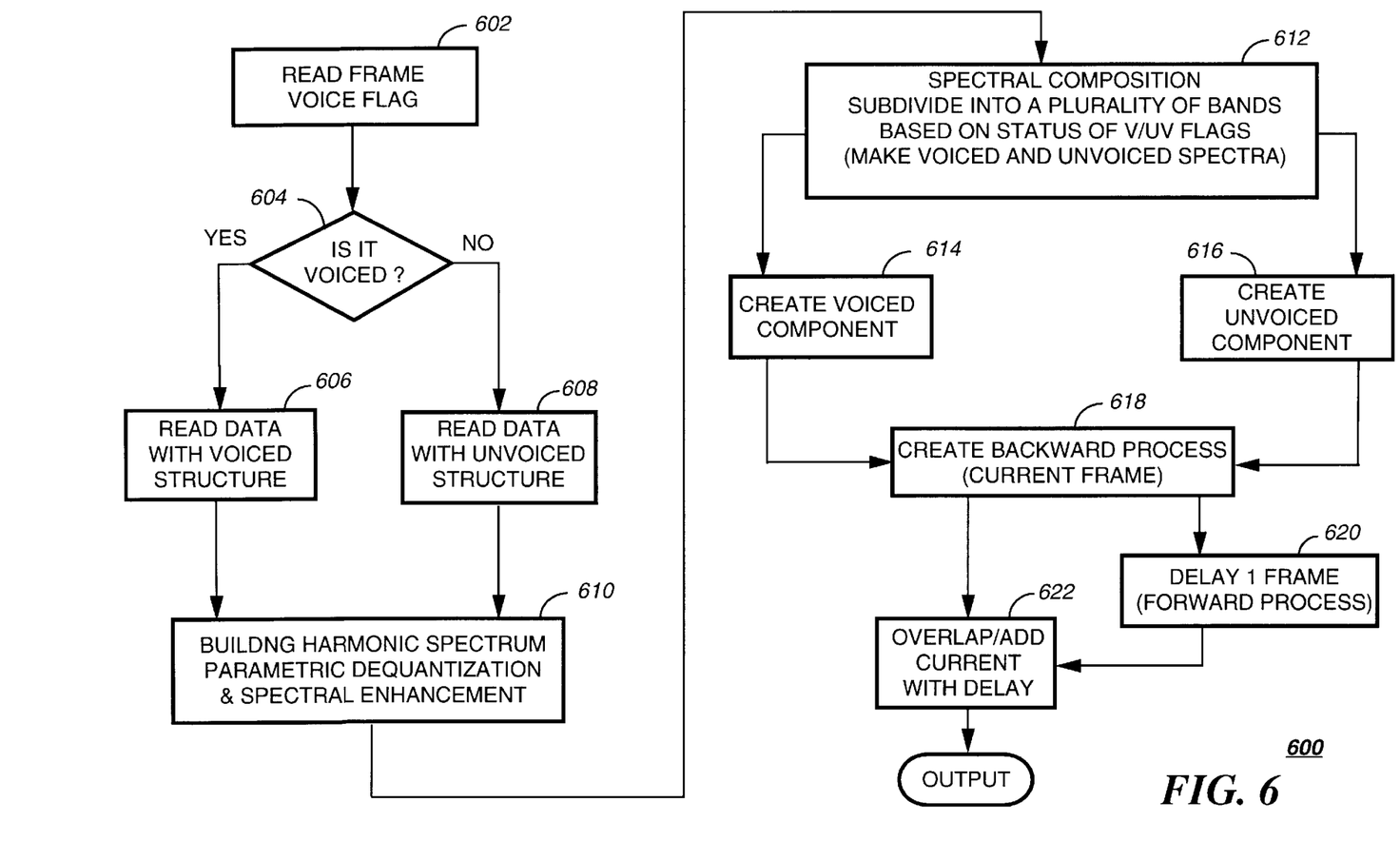
FIG. 6 is a diagram illustrating the method of operation of the voicing processor used in the MBE synthesizer shown in FIG. 4 in accordance with the present invention.

FIG. 6 is a flow chart illustrating a method 600 of decoding a voice message having voiced components and unvoiced components within a frame of the voice message. Initially, the method would begin by determining if a frame of information is voiced or unvoiced by reading a frame voice flag at step 602. If the flag indicates a voiced frame at a decision block 604, then the data is read with a voiced structure at step 606. If the flag indicates an unvoiced frame at a decision block 604, then the data is read with a unvoiced structure at step 608. In either case, the method proceeds at step 610 in building a harmonic spectrum of the message which may further include parametric dequantization and spectral enhancing. Then, at step 612 the harmonic spectrum is subdivided into a plurality of bands, each band of the plurality of bands having a respective band voicing flag. Step 612 results in the creation or building of a voiced component 614 and an unvoiced component 616 based on a status of the band voicing flag. Preferably, the voiced spectrum and the unvoiced spectrum are each processed to get respectively a voiced signal and an unvoiced signal in the time domain. These two components are preferably added in a "backward process" 618 to provide a current frame of data. In addition, the method proceeds with a delay or "forward process" 620 which in turn allows for overlap adding techniques of adding the current frame with the delayed frame at step 622 resulting in a synthesized signal of the voice message.

Figure 7:
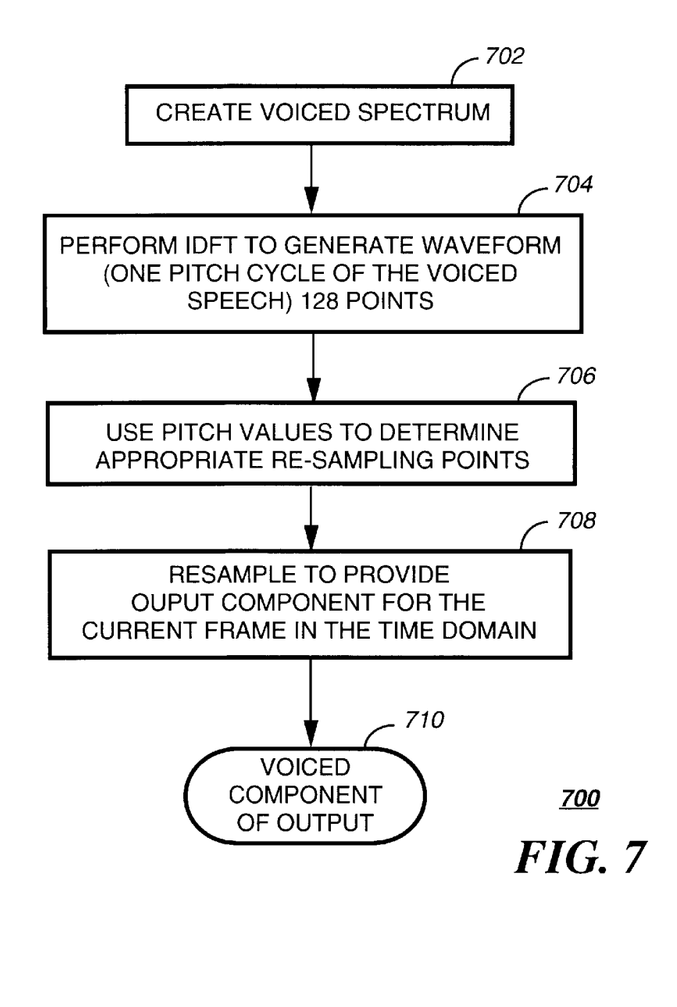
FIG. 7 is a diagram illustrating the method of operation of creating the voiced component in accordance with the present invention.

With reference to FIGS. 6 and 7, the step of creating the voiced component 614 or 700 involves the steps of creating a pitch waveform in the time domain by performing an inverse discrete Fourier transform at step 704. Preferably, one pitch cycle of the voiced speech is formed in 128 points. Then, at step 706, the pitch values are used to determine the appropriate re-sampling points. At step 708, the waveform is resampled to provide the voiced output component for the current frame in the time domain.

Figure 8:
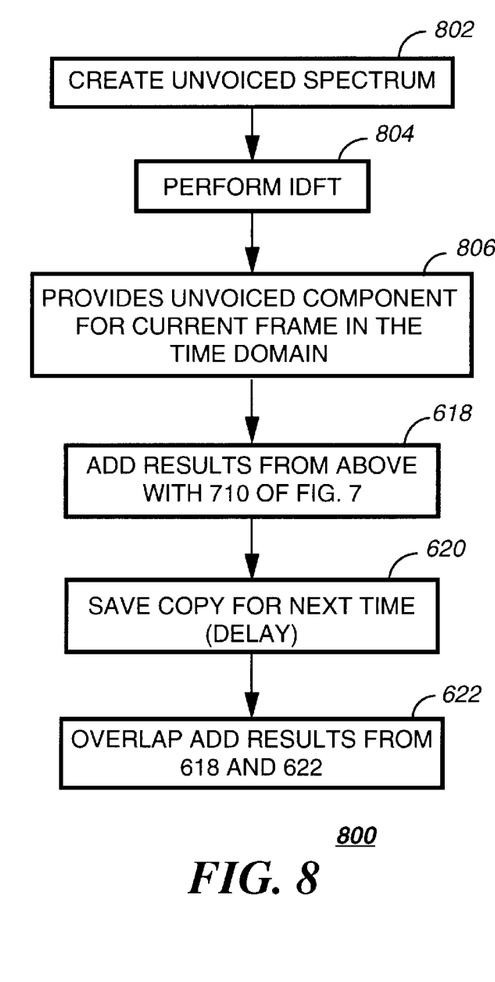
FIG. 8 is a diagram illustrating the method of operation of creating the unvoiced component and adding it to the voice component in accordance with the present invention.

With reference to FIGS. 6, 7 and 8, the step of creating the unvoiced component 616 involves the steps of creating the unvoiced spectrum at step 802 and then performing an IDFT function at step 804 to provide at step 806 an unvoiced component for the current frame in the time domain. The results from step 806 are then added with voiced component of the output 710 of FIG. 7. At step 620, a copy of the current frame is saved for the next time period (delay). Then, the results from steps 618 and steps 622 are overlap added in providing the synthesized voice message in the overall method 800.

In summary, a MBE synthesizer is described herein that accurately reproduces voice from compressed data while maintaining good speech quality. The MBE synthesizer described above reduces the number of DSP cycles and the size of the ROM required in the receiver, an important consideration when designing portable equipment and reduces the quantity of data that must be transmitted, another important consideration when designing a communication system that has maximum throughput.

As hitherto stated, the very low bit rate voice messaging system in accordance with the present invention digitally encodes the voice messages in such a way that the resulting data is very highly compressed and can easily be mixed with the normal data sent over a paging channel. While specific embodiments of this invention have been shown and described, it can be appreciated that further modification and improvement will occur to those skilled in the art.

We claim:

1. A multi-band excitation (MBE) synthesizer for generating speech from information received by a receiver, the information received including spectral information and excitation information representing a segment of speech, said MBE synthesizer comprising:

a voiced signal generator for generating voiced signal components in the time domain using a pitch wave generator and a pitch wave resampler;

an unvoiced signal generator for generating unvoiced signal components in the time domain; and a voicing processor, responsive to band voicing flags within the excitation information, for controlling selection of a voiced spectral component or an unvoiced spectral component from a harmonic amplitude spectrum.

2. The MBE synthesizer of claim 1, wherein the pitch wave generator uses an inverse discrete Fourier transform to generate a waveform which will be further processed to provide voiced signal components in the time domain.

3. The MBE synthesizer of claim 1, wherein the unvoiced signal generator uses a inverse discrete Fourier transform to provide the unvoiced signal components in the time domain.

4. The MBE synthesizer of claim 1, wherein the voiced signal components and the unvoiced signal components are combined to form a speech signal for a current frame.

5. The MBE synthesizer of claim 4, wherein the speech signal from the current frame is combined with a speech signal from a previous frame using an overlap adder.

6. A method of decoding a voice message having voiced components and unvoiced components within a frame of the voice message, comprising the steps of:

building a harmonic spectrum of a speech segment of the voice message;

subdividing the harmonic spectrum into a plurality of bands, each band of the plurality of bands having a respective band voicing flag;

building a voiced spectrum and an unvoiced spectrum based on a status of the band voicing flag;

processing the voiced spectrum with fixed phase values to get a voiced signal in the time domain;

processing the unvoiced spectrum to get an unvoiced signal in the time domain; and     adding the voiced signal and the unvoiced signal to provide a synthesized signal of the speech segment.

7. The method of claim 6, wherein the step of processing the voiced spectrum further comprises the step of creating a pitch wave in the time domain by performing an inverse discrete Fourier transform and further resampling the pitch wave.

8. The method of claim 6, wherein the step of processing the unvoiced spectrum further comprises the step of performing an inverse discrete Fourier transform on the unvoiced spectrum.

9. The method of claim 6, wherein the step of processing the voiced spectrum further comprises the step of interpolating a pitch function in a speech synthesizer from discrete pitch values included in a compressed voice message, wherein the step of interpolating the pitch function comprises the steps of:

receiving at least 2 frames of the compressed voice message including a respective pitch value for each of the frames;

determining whether interpolation is appropriate from frame to frame;

creating a linear pitch frequency function across adjacent frames if it is determined that interpolation is appropriate;

deriving resampling points based on the linear pitch frequency function; and     sampling a pitch waveform at the derived resampling points using linear interpolation as needed.

10. The method of claim 9, wherein the method further comprises the step of allowing a discontinuous jump in the pitch frequency if the respective pitch values' variation from frame to frame is beyond a predetermined threshold.

\* \* \* \* \*